(12) United States Patent
Norn et al.

(10) Patent No.: US 8,221,820 B2
(45) Date of Patent: Jul. 17, 2012

(54) FROZEN FOOD PRODUCTS, EMULSIFYING SYSTEMS, AND RELATED METHODS

(75) Inventors: Viggo Creemers Norn, Stouby (DK); Hanne Kranold Ludvigsen, Brabrand (DK)

(73) Assignee: Palsgaard A/S, Julesminde (DK)

( * ) Notice: Subject to any disclaimer, the term of this patent is extended or adjusted under 35 U.S.C. 154(b) by 215 days.

(21) Appl. No.: 12/516,506

(22) PCT Filed: Nov. 27, 2006

(86) PCT No.: PCT/DK2006/000662
§ 371 (c)(1),
(2), (4) Date: Dec. 17, 2009

(87) PCT Pub. No.: WO2008/064675
PCT Pub. Date: Jun. 5, 2008

(65) Prior Publication Data
US 2010/0092644 A1 Apr. 15, 2010

(51) Int. Cl.
*A23L 1/035* (2006.01)
(52) U.S. Cl. ........ 426/654; 426/566; 426/106; 426/519; 426/565; 426/100; 426/101; 426/444
(58) Field of Classification Search ................ 426/654, 426/566, 106, 519, 565, 100, 101, 444
See application file for complete search history.

(56) References Cited

U.S. PATENT DOCUMENTS

| | | | |
|---|---|---|---|
| 2,821,480 A | 1/1958 | Hilker | |
| 3,246,992 A | 4/1966 | Noznick et al. | |
| 3,515,562 A | 6/1970 | Landfried et al. | |
| 3,968,266 A | 7/1976 | Baugher | |
| 4,127,679 A | 11/1978 | Amano et al. | |
| 4,199,608 A | 4/1980 | Gilmore et al. | |
| 4,307,123 A | 12/1981 | Bundus | |
| 4,500,553 A | 2/1985 | Liggett et al. | |
| 4,542,035 A | 9/1985 | Huang et al. | |
| 5,360,627 A | 11/1994 | Desai et al. | |
| 5,851,576 A | 12/1998 | Abboud | |
| 6,083,546 A | 7/2000 | Carrick et al. | |
| 7,488,504 B2 * | 2/2009 | Barfod et al. | ................ 426/654 |
| 7,727,573 B2 * | 6/2010 | Vaghela et al. | ................ 426/565 |
| 2005/0123666 A1 | 6/2005 | Vaghela et al. | |
| 2010/0278976 A1 * | 11/2010 | Norn et al. | ....................... 426/66 |

FOREIGN PATENT DOCUMENTS

| | | |
|---|---|---|
| EP | 1 597 976 A1 | 11/2005 |
| EP | 1 602 283 A1 | 12/2005 |
| EP | 1 202 638 B1 | 4/2007 |
| GB | 1077338 | 7/1967 |
| GB | 1 446 144 | 8/1976 |
| JP | 7-303453 | 11/1995 |
| WO | WO 2005/060763 A1 | 7/2005 |

OTHER PUBLICATIONS

Bray, F., "I dessert semifreddi," *Industrie Alimentari* (1984) 23: 191-195.
Martin et al., "Preparation and phase behavior of positionally isomeric propylene glycol monoesters," *J. Am. Chem. Soc.* (1965) 42: 529-533.
EP Search Report for corresponding EP Application No. EP 10169046.9 mailed on Sep. 12, 2011.

* cited by examiner

*Primary Examiner* — Anthony Weier
(74) *Attorney, Agent, or Firm* — Merchant & Gould P.C.

(57) ABSTRACT

The present invention relates to frozen food products, such as ice creams, having special emulsifying systems. The emulsifying system preferably contains mono esters of propane-1, 2-diol and fatty acids, such as 2-PGME, and it may furthermore contain additional emulsifiers such as 1-PGME and/or diglycerides. The frozen food products are characterised by improved organoleptic and sensory properties as well as reduced rate of melting. The invention furthermore relates to the emulsifying systems as such as well as methods of preparing the frozen food product.

19 Claims, 5 Drawing Sheets

FROZEN FOOD PRODUCTS, EMULSIFYING SYSTEMS, AND RELATED METHODS

This application is a National Stage Application of PCT/DK2006/000662, filed Nov. 27, 2006, and which application is incorporated herein by reference. To the extent appropriate, a claim of priority is made to each of the above disclosed applications.

TECHNICAL FIELD OF THE INVENTION

The present invention relates to frozen food products, such as ice creams, comprising special emulsifying systems. The emulsifying system preferably contains mono esters of propane-1,2-diol and fatty acids, such as 2-PGME, and it may furthermore contain additional emulsifiers such as 1-PGME and/or diglycerides. The invention furthermore relates to the emulsifying systems as such as well as methods of preparing the frozen food product.

BACKGROUND OF THE INVENTION

Frozen food products, such as ice creams, are particularly appreciated for their creamy and smooth characteristics. The organoleptic characteristics of traditional frozen food products are sensitive to even small temperature variations which is typically observed during storage, distribution, or handling. This is particularly problematic when a consumer purchases a frozen food product and does not consume it quickly. When a longer period of time elapses from the frozen food products is taken from the deep frozen section in the retail store until it is placed in a domestic freezer, a partial thawing of the frozen product takes place before it is refrozen. Such cycles of temperature variation, which is known as "heat shock", is known to reduce the overall organoleptic perception of the frozen food products.

In the prior art some emulsifiers have been applied in the preparation of frozen food products to reduce this problem:

In the US patent application US 2005/0,123,666 an ice cream containing a propylene glycol monoester, unsaturated monoglycerides, and sorbitan tri-stearates is disclosed.

The PCT application WO 2005/060,763 a low fat ice cream formulation comprising a propylene glycol monoester and a mono-diglyceride is disclosed.

However, there is still an unmet need for frozen food products having an improved quality and an improved robustness towards heat shock.

SUMMARY OF THE INVENTION

An object of the present invention is to provide a frozen food product having improved organoleptic properties, as well as methods of production and emulsifying systems useful for preparing said frozen food product.

In particular, it is an object of the present invention to provide a frozen food product having one or more of the characteristics: a reduce melt rate, an improved creaminess, a reduced coolness, an improved smoothness, and combinations thereof.

The inventors have made the surprisingly discovery that 2-PGME used in frozen food products, and particularly in low fat frozen food products, results in improved organoleptic and sensory properties as well a reduced rate of melting.

Thus, one aspect of the invention relates to a frozen food product comprising an emulsifying system comprising a 2-propylene glycol monoester of a fatty acid (2-PGME).

Another aspect of the present invention relates to an emulsifying system comprising a 2-PGME of a fatty acid.

Yet an aspect of the present invention is to provide a packaged emulsifying system comprising a container, said container comprising said emulsifying system.

Yet another aspect of the present invention is to provide a method of preparing a frozen food product, the method comprising the step of
a) mixing a food intermediate with said emulsifying system,
b) optionally, heating the mixture to a temperature sufficient for the emulsifying system to melt, and
c) freezing the resulting mixture.

Still another aspect of the present invention is the use of said emulsifying system for emulsifying a frozen food product.

Still another aspect of the present invention is the use of said emulsifying system for emulsifying frozen desserts, ice cream, low fat ice cream, ice milk, sherbets, sorbet, frozen fruit juice, frozen yoghurt, frozen water ice, aerated frozen bars, whipped dairy cream, unwhipped dairy cream, whipped imitation creams and unwhipped imitation creams.

In general the various aspects of the invention may be combined and coupled in any way possible within the scope of the invention. These and other aspects, features and/or advantages of the invention will be apparent from and elucidated with reference to the embodiments described hereinafter.

The present invention will now be described in more detail in the following.

DETAILED DESCRIPTION OF THE INVENTION

An aspect of the invention relates to a frozen food product comprising an emulsifying system comprising a 2-propylene glycol monoester of a fatty acid (2-PGME).

In the context of the present invention, the term "emulsifying system" generally relates to the emulsifier(s) of the frozen food product as well as other useful components, such as additives and/or solvents. The emulsifying system may comprise one or more emulsifiers, such as 2, 3, 4, 5 or 6 different emulsifiers. The components of the emulsifying system can both be applied to the other ingredients of the frozen food product as a mixture, or separately but at the same time. Alternatively, the components of the emulsifying system can be applied to the other ingredients of the frozen food product separately and at different times during the production of the frozen food product.

In the context of the present invention, the term "2-propylene glycol monoester of a fatty acid" or "2-PGME" relates to a mono ester of a fatty acid and propane-1,2-diol having the general formula I, wherein R is the hydrocarbon portion of the fatty acid, which fatty acid has been esterified with propane-1,2-diol. The general formula I includes any enatiomers and racemates of the 2-PGME.

In some preferred embodiments of the invention, the emulsifying system additionally comprises a 1-propylene glycol monoester of a fatty acid (1-PGME). In the context of the present invention, the term "1-propylene glycol monoester of a fatty acid" or "1-PGME" relates to a mono ester of a fatty acid and propane-1,2-diol having the general formula II wherein R is the hydrocarbon portion of the fatty acid, which fatty acid has been esterified with propane-1,2-diol. The general formula II includes any enatiomers and racemates of the 1-PGME.

Preparation of the 2-PGME and 1-PGME is well known to the person skilled in the art, e.g. in Martin and Lutton, the contents of which are incorporated herein by reference. The preparation of the 2-PGME and 1-PGME may e.g. involve esterification using protection groups to protect either the 1-hydroxy or the 2-hydroxy group. Alternatively, 2-PGME or 1-PGME may be provided by isolating the individual molecular species from a mixture of 2-PGME and 1-PGME by means of chromatography.

The ratio by weight of 2-PGME and 1-PGME may e.g. be at least 1:4, such at least 1:3, or at least 3:7, preferably at least 1:2, such as at least 4:7, and even more preferably at least 4:6, such as at least 1:1. It is envisioned that the ratio by weight of 2-PGME and 1-PGME in the emulsifying system may e.g. be at least 2:1, such as at least 3:1, at least 8:2, or at least 9:1.

In the context of the present invention, the term "weight ratio" relates to the ratio between the weights of the mentioned components. For example, a mixture comprising 2 g 2-PGME and 6 g 1-PGME would have a ratio by weight of 2-PGME and 1-PGME of 2:6 which is equal to 1:3 or 0.333 (that is: 1 divided with 3). Similarly, a mixture comprising 2 g 2-PGME and 4 g 1-PGME would have a ratio by weight of 2-PGME and 1-PGME of 2:4 which is equal to 1:2 or 0.5 (that is: 1 divided with 2).

The ratio by weight of 2-PGME and 1-PGME is normally in the range of 1:10 to 10:1, such as in the range of 1:8-8:1, preferably in the range of 1:6-6:1; such as in the range of 1:4-4:1, and even more preferably in the range of 1:2-2:1, such as in the range of 1:1.5-1.5:1, and preferably in the range of 4:5 to 5:4

It is also envisioned that the ratio by weight of 2-PGME and 1-PGME may be in the range of 3:7 to 10:1, such as in the range of 3:7 to 8:1, preferably in the range of 3:7 to 6:1, such as in the range of 3:7 to 4:1, and even more preferably in the range of 3:7 to 2:1, such as in the range of 3:7 to 1:1.

It is also envisioned that the ratio by weight of 2-PGME and 1-PGME may be in the range of 3:7 to 10:1, such as in the range of 1:1 to 10:1, preferably in the range of 2:1 to 10:1, such as in the range of 4:1 to 10:1, and even more preferably in the range of 6:1 to 10:1, such as in the range of 8:1 to 10:1.

Normally, the 2-PGME is present in an amount of at least 0.01% by weight of the frozen food product. The 2-PGME may for example be present in an amount of at least 0.05% by weight of the frozen food product, such as at least 0.1%, and preferably at least 0.2%, such as at least 0.25%.

In the context of the present invention, mentioned percentages are weight/weight percentages unless stated otherwise.

The 1-PGME may e.g. be present in an amount of at least 0.01% by weight of the frozen food product. The 1-PGME may for example be present in an amount of at least 0.05% by weight of the frozen food product, such as at least 0.1%, and preferably at least 0.15%, such as at least 0.20%.

Typically, the 2-PGME is present in an amount of at least 0.01% by weight of the frozen food product and the 1-PGME is typically present in an amount of at least 0.01% by weight of the frozen food product. The 2-PGME may e.g. be present in an amount of at least 0.05% by weight of the frozen food product and the 1-PGME may for example be present in an amount of at least 0.05% by weight of the frozen food product, such as at least 0.1% of 2-PGME and at least 0.1% 1-PGME, and preferably at least 0.2% of the 2-PGME and at least 0.15% of the 1-PGME, such as at least 0.25% of 2-PGME and at least 0.2% of 1-PGME.

The 2-PGME may be present in an amount of 0.01% to 10% by weight of the frozen food product, such as 0.05% to 8%, preferably 0.1% to 6%, such as 0.15% to 5%, and even more preferably 0.2% to 4%, such as 0.2% to 3.5%.

The 1-PGME may be present in an amount of 0.01% to 10% by weight of the frozen food product, such as 0.05% to 8%, preferably 0.1% to 6%, such as 0.1% to 5%, and even more preferably 0.15% to 4%, such as 0.2% to 3.0%.

Normally, the 2-PGME is present in an amount of 0.01% to 10% by weight of the frozen food product and normally, the 1-PGME is present in an amount of 0.01% to 10% by weight of the frozen food product. The 2-PGME may e.g. be present in an amount of 0.05% to 8 by weight of the frozen food product and the 1-PGME may for example be present in an amount of 0.05% to 8% by weight of the frozen food product, such as 0.1% to 6% of 2-PGME and 0.1% to 6% of 1-PGME, preferably 0.15% to 5% 2-PGME and 0.1% to 5% 1-PGME, such as 0.2% to 4% 2-PGME and 0.15% to 4% 1-PGME, and even more preferably 0.2% to 3.5% 2-PGME and 0.2% to 0.3%.

It is also envisioned that the 2-PGME may be present in an amount of 0.05% to 1% by weight of the frozen food product and the 1-PGME is present in an amount of 0.05% to 1% by weight of the frozen food product.

In some embodiments of the present invention the emulsifying system comprises one or more additional emulsifiers.

For example, at least one of the one or more additional emulsifiers may be selected from the group consisting of a carboxylic acid ester of a monoglyceride, a carboxylic acid ester of a diglyceride, a phospholipid, a phospholipid derivative, a polyglycerol ester of polyricinolic acid, a polyglycerol ester of fatty acids, a citric acid ester of mono glycerides (citrem), sodium stearoyl lactylates (CSL), calcium stearoyl lactylates (SSL), a polysorbate, an ammonium phosphatide, sorbitan tristearate (STS), lactylated monoglycerides (LACTEM), acetylated monoglycerides (ACETEM), unsaturated monoglycerides, and mixtures thereof.

The additional emulsifier may for example be a diglyceride. A diglyceride is the diester of two fatty acids and glycerol and may e.g. comprise the 1,2-diester and/or 1,3 diester of the fatty acids and glycerol.

The inventors have made the surprisingly discovery that the combination of 2-PGME and diglyceride used in frozen food products, and particularly in low fat frozen food products, results in improved organoleptic properties and melting properties relative to using 1-PGME, or 1-PGME and monoglyceride.

In another embodiment of the present invention the additional emulsifier may e.g. be a monoglyceride. A monoglyceride is a monoester of a fatty acid and glycerol.

In still another embodiment the additional emulsifier may for example be a monoglyceride and a diglyceride.

The fatty acid of the monoglyceride may e.g. be a saturated fatty acid.

The fatty acids of the diglyceride may e.g. be saturated fatty acids.

The fatty acid of the monoglyceride may e.g. be an unsaturated fatty acid.

The fatty acids of the diglyceride may e.g. be unsaturated fatty acids.

The unsaturated fatty acids used in the context of the present invention, and particularly in the context of the 1-PGME and 2-PGME, in the context of the diglyceride, or in the context of triglycerides, may e.g. comprise double bonds in the cis configuration or in the trans configuration. It is even envisioned that a fatty acid may both comprise a double bond in the cis configuration and a double bond in the trans configuration.

In preferred embodiments of the invention, a large fraction of double bonds of the fatty acids of the 1-PGME and 2-PGME and/or of the diglycerides are in the cis configuration. For example, at least 75% of the double bonds of the fatty acids of the 1-PGME and 2-PGME and/or of the diglycerides may be in the cis configuration, such as at least 85%, preferably at least 90%, such as at least 95%, and even more preferably at least 97.5% of the double bonds of the fatty acids may be in the cis configuration, such as at least 99%. In some embodiments of the invention substantially none of the fatty acids of the 1-PGME and 2-PGME and/or of the diglycerides are in the trans configuration.

In preferred embodiments of the invention, a large fraction of double bonds of the fatty acids of the triglycerides, e.g. the triglycerides of the used fats, are in the cis configuration. For example, at least 75% of the double bonds of the fatty acids of the triglycerides may be in the cis configuration, such as at least 85%, preferably at least 90%, such as at least 95%, and even more preferably at least 97.5% of the double bonds of the fatty acids may be in the cis configuration, such as at least 99%. In some embodiments of the invention substantially none of the fatty acids of the triglycerides are in the trans configuration.

The diglyceride may e.g. be present in an amount of at least 0.01% by weight of the frozen food product, such as at least 0.05% by weight, and preferably at least 0.1%, such as at least 0.15%, and even preferably at least 0.2%, such as at least 0.25%.

The monoglyceride may e.g. be present in an amount of at least 0.01% by weight of the frozen food product, such as at least 0.03%, and preferably at least 0.061%, such as at least 0.08%.

Normally, the diglyceride is present in an amount of 0.01% to 5.0% by weight of the frozen food product. The diglyceride may for example be present in an amount of 0.02% to 3% of the frozen food product, such as 0.05% to 1%, and preferably 0.01% to 0.75%, such as 0.15% to 0.5%, and even more preferably 0.20% to 0.40%.

Typically, the monoglyceride is present in an amount of 0.01% to 5.0% by weight of the frozen food product. The monoglyceride may for example be present in an amount of 0.02% to 3% of the frozen food product, such as 0.05% to 1%, and preferably 0.01% to 0.75%, such as 0.15% to 0.5%, and even more preferably 0.20% to 0.40%.

In some embodiments of the invention, the monoglyceride is present in an amount of 0.01% to 5.0% by weight of the frozen food product and the diglyceride is present in an amount of 0.01% to 5.0% by weight of the frozen food product In some preferred embodiments of the invention, the monoglyceride is present in an amount of 0.02% to 1.0% by weight of the frozen food product and diglyceride is present in an amount of 0.05% to 2.0% by weight of the frozen food product.

In an even more preferred embodiment of the invention, the monoglyceride is present in an amount of 0.05% to 0.25% by weight of the frozen food product and diglyceride is present in an amount of 0.1% to 0.5% by weight of the frozen food product.

For example, the monoglyceride may be present in an amount of 0.05% to 0.3% by weight and the diglyceride may be present in an amount of 0.15% to 0.5% by weight.

In some preferred embodiments of the invention, the frozen food product comprises 2-PGME in an amount of 0.01% to 10% by weight, 1-PGME in an amount of 0.01% to 10% by weight, monoglyceride in an amount of 0.01% to 5.0% by weight, and diglyceride in an amount of 0.01% to 5.0% by weight.

The frozen food product may e.g. comprise 2-PGME in an amount of 0.05% to 1% by weight, 1-PGME in an amount of 0.02% to 1% by weight, monoglyceride is present in an amount of 0.01% to 1% by weight, and diglyceride is present in an amount of 0.05% to 1% by weight.

The frozen food product may e.g. comprise 2-PGME in an amount of 0.05% to 0.5% by weight, 1-PGME in an amount of 0.05% to 0.5% by weight, monoglyceride in an amount of 0.15% to 0.5% by weight, and diglyceride in an amount of 0.05% to 0.5% by weight.

The ratio by weight between the monoglyceride and the diglyceride is typically at most 95:5, such as at most 75:25, preferably at most 50:50, such as at most 40:60, and even more preferably at most 25:75, such as at most 10:90.

In some embodiments of the invention, the ratio by weight between monoglyceride and diglyceride is in range of 2:98 to 98:2, such as 3:97 to 80:20, preferably in the range of 4:96 to 60:40, and even more preferably in the range 5:95 to 40:60, such as 6:94 to 25:75.

In some preferred embodiments of the invention, the frozen food product additionally comprises one or more stabilizers.

The stabilizer may contain one or more different stabilizers, e.g. 2 different stabilizers, 3 different stabilisers, 4 different stabilisers, or 5 different stabilizers.

The stabilizer may e.g. comprise at least one stabilizer selected from the group of agar, gelatine, gum acacia, pectin, guar gum, locust bean gum, tara gum, gum tragacanth, xanthan, carrageenan, semi-refined carrageenan, eucheuma seaweed, semi-refined seaweed, semi-refined carrageenan, carboxymethyl cellulose, microcrystalline cellulose, sodium alginate, propyleneglycol alginate and its salts, carob gum, guar gum, alginate, starch, and mixtures thereof.

In some preferred embodiments of the invention, the frozen food product additionally comprises one or more anti-freeze proteins.

In some preferred embodiments of the invention, the frozen food product additionally comprises one or more freezing point depressants.

The freezing point depressant may e.g. comprise at least one freezing point depressant selected from the group of an alcohol, a polyol, a sugar, and a mixture thereof.

A useful alcohol is e.g. ethanol.

Useful polyols are e.g. sorbitol, mannitol, lactitol, xylitol, maltitol, glycerol, isomalt, erythritol, or mixtures thereof.

Useful sugars are e.g. sucrose, dextrose, fructose, fructose syrup, oligofructose, glucose syrup, polydextrose, corn syrup, inulin, or mixtures thereof.

In some preferred embodiments of the invention, the frozen food product additionally comprises one or more isomerization inhibitors.

The isomerization inhibitor may e.g. comprise a chelating agent.

The chelating agent may comprise one or more chelating agents selected from the group consisting of an amino acid, an aminocarboxylate, a hydroxycarboxylate, a polyphosphate, and mixtures thereof.

A useful amino acid chelating agent is e.g. glycine.

A useful aminocarboxylate chelating agent is e.g. ETDA.

Useful hydroxycarboxulate chelating agents are e.g. citric acid, tataric acid, or gluconic acid.

Useful polyphosphate chelating agents are e.g. hexametaphoshoric acid, pyrophosphoric acid, disodiumphosphate, tripolyphosphoric acid, or phytic acid.

In some embodiments of the invention, the chelating agent is an at least bidentate chelating agent, such as an at least tridentate chelating agent, such as an at least tetradentate chelating agent, preferably an at least pentadentate chelating agent, and even more preferably an at least hexadentate chelating agent.

An at least bidentate chelating agent is capable of forming at least 2 co-ordinate bonds with the same metal ion. An at least tridentate chelating agent is capable of forming at least 3 co-ordinate bonds with the same metal ion. An at least tetradentate chelating agent is capable of forming at least 4 co-ordinate bonds with the same metal ion. An at least pentadentate chelating agent is capable of forming at least 5 co-ordinate bonds with the same metal ion. An at least hexadentate chelating agent is capable of forming at least 6 co-ordinate bonds with the same metal ion.

Useful tridentate chelating agents are e.g. di-carboxylic acids such as malonic acid, or e.g glycine.

Useful tridentate chelating agents are e.g. tri-carboxylic acids such as citric acid.

Useful tetradentate chelating agents are e.g. corrole molecules, heme molecules, triethylenetetramine (trien), tris(2-aminoethyl)amine (tren), tris(2-diphenylphosphineethyl)amine, and nitrilotriacetic acid (nta).

A useful pentadentate chelating agents is e.g ethylenediaminetriacetate.

Useful hexadentate chelating agents are e.g. ethylenediaminetetraacetate (EDTA) and 1,10-diaza-4,7,13,16,21,24-hexaoxabicyclo[8.8.8]hexacosane (Cryptand [2,2,2]).

In some preferred embodiments of the invention, the chelating agent is EDTA.

The present invention may be employed in a wide range of frozen food products, and is particularly advantageous in aerated frozen food products.

Thus, in some preferred embodiments of the invention, the frozen food product is an aerated frozen food product.

In the context of the present invention, the term "aerated frozen food product" means that the frozen food product contains small air bubbles, typically smaller than 0.5 mm in diameter and sometimes even smaller than 0.1 mm. The degree of aeration is often measured by means of the overrun of the aerated frozen food product.

In the context of the present invention, the term "overrun" relates to the %-increase of the volume of an aerated frozen food product relative to a frozen food product without any air bubbles, which increase can be related to the air bubbles of the aerated frozen food product.

The overrun may e.g. be determined by taking a sample having the volume $V_a$ of an aerated frozen food product. The sample of the aerated frozen food product is then melted and the air bubbles are removed, e.g. by degassing. The volume of the melted food product without air bubbles, $V_m$, is then measured. The overrun, O, can be determined as $$O = \frac{V_a - V_m}{V_m} \cdot 100\%$$

An aerated frozen food product typically has an overrun of at least 0.5%, such as at least 1%.

The frozen food product typically has an overrun of at least 10%, such as at least 10% or at least 50%, preferably at least 100% such as at least 150%, and in some types of frozen food products even more preferably at least 200% such as at least 250%.

The frozen food product may e.g. have an overrun in the range of 10%-300%, such as in the range of 25%-250%, preferably in the range of 50%-200%, and even more preferably in the range of 75%-150%, such as in the range of 100%-125%.

The frozen food product may e.g. comprise at least one frozen food product selected from the group consisting of ice cream, low fat ice cream, ice milk, sherbet, sorbet, frozen fruit juice, frozen yoghurt, frozen water ice, aerated frozen bars, frozen dessert, frozen aerated cream, and a combination thereof.

It is thus envisioned that the frozen food product may be a combination of different types of conventional frozen food product, such as a combination of frozen ice cream and frozen sorbet; or frozen low fat ice cream and frozen fruit juice.

In some embodiments of the invention, the frozen food product is a low fat frozen food product. The low fat frozen food product normally comprises at most 10% fat by weight, such as at most 5% fat, preferably at most 3% fat, such as at most 2% fat by weight, or at most 1% fat by weight.

In the context of the present invention, the term "fat" should be interpreted broadly and generally relates to one or more triglycerides independent of their melting temperature. The term "fat" comprises both triglycerides that are in liquid form at 25° C., as well as triglycerides that are in solid or semi-solid form at 25° C.

In some preferred embodiments of the invention, the frozen food product is an ice cream.

The ice cream typically comprises fat in an amount of 0.01-25% by weight, and preferably in an amount of 0.1-18% by weight.

The ice cream typically comprises bulking agent in an amount of 1-35% by weight, and preferably in an amount of 5-25% by weight.

Typically, the bulking agent comprises at least one bulking agent selected from the group consisting of a sugar, sugar alcohol, polydextrose, maltodextrin, a polyol, native starch, modified starch, microcrystalline cellulose, and mixtures thereof.

The ice cream typically comprises milk solid non-fat in an amount of 0.5-30% by weight, and preferably in an amount of 2-20% by weight.

In the context of the present invention, the term "milk solid non-fat" relates to solid materials that can be derived from milk, and which solid material is not fat.

The ice cream typically comprises emulsifying system in an amount of 0.01-10% by weight, and preferably in an amount of 0.1-2% by weight.

The ice cream typically comprises stabilizer in an amount of 0.01-5% by weight in an amount of 0.1-2% by weight.

The ice cream typically comprises water in an amount of 20-90% by weight, and preferably in an amount of 40-80% by weight.

In some embodiments of the invention, the ice cream comprises fat in an amount of 0.1-18% by weight, bulking agent in an amount of 5-25% by weight, milk solid non-fat in an amount of 2-20% by weight, emulsifying system in an amount of 0.01-10% by weight, stabilizer in an amount of 0.01-5% by weight, and water in an amount of 40-80% by weight.

The present inventors have found that the emulsifying system of the present invention is very useful as an emulsifier for low fat ice cream. Thus, in some preferred embodiments of the invention, the frozen food product is a low fat ice cream.

The low fat ice cream normally comprises at most 10% fat by weight, such as at most 5% fat, preferably at most 3% fat, such as at most 2% fat by weight, or at most 1% fat by weight.

Even lower amounts of fat may be used, thus, the low fat ice cream may comprise at most 3% fat by weight, such as at most 2% fat, preferably at most 1% fat, such as at most 0.5% fat by weight, or at most 0.2% fat by weight.

A low fat ice cream may e.g. comprise fat in an amount of 0.01-10% by weight, such as in an amount of 0.05-8% by weight, preferably in an amount of 0.1-5% by weight, and even more preferably in an amount of 0.25-3% by weight.

The low fat ice cream may comprise fat in an amount of 0.01-10% by weight, bulking agent in an amount of 5-35% by weight, milk solid non-fat in an amount of 5-15% by weight, emulsifying system in an amount of 0.01-10% by weight, stabilizer in an amount of 0.01-15% by weight, and water in an amount of 40-80% by weight.

A low fat ice cream typically comprises fat in an amount of 0.1-5% by weight, bulking agent in an amount of 5-35% by weight, milk solid non-fat in an amount of 5-15% by weight, emulsifying system in an amount of 0.01-10% by weight, stabilizer in an amount of 0.01-15% by weight, and water in an amount of 40-80% by weight.

The frozen food product may e.g. comprise a frozen yoghurt.

The frozen food product may e.g. comprise a sorbet.

The frozen food product may also comprise a sherbet.

In some embodiments of the invention, the frozen food product comprises or essentially consists of an aerated cream and the emulsifier system. Normally, an aerated cream contains at least 10% fat by weight, such as at least 15% fat by weight, preferably at least 25% fat by weight, such as at least 30% fat by weight, and even more preferably at least 40% fat by weight, such as at least at 50% fat by weight. The aerated cream preferably comprises milk fat.

Another aspect of the invention relates to an emulsifying system as described herein, i.e. an emulsifying system comprising a 2-PGME of a fatty acid.

In some preferred embodiments of the invention, the emulsifying system furthermore comprises a 1-PGME of a fatty acid.

The ratio by weight of 2-PGME and 1-PGME in the emulsifying system may e.g. be at least 1:4, such at least 1:3, or at least 3:7, preferably at least 1:2, such as at least 4:7, and even more preferably at least 4:6, such as at least 1:1. It is envisioned that the ratio by weight of 2-PGME and 1-PGME in the emulsifying system may e.g. be at least 2:1, such as at least 3:1, at least 8:2, or at least 9:1.

The ratio by weight of 2-PGME and 1-PGME in the emulsifying system is normally in the range of 1:10 to 10:1, such as in the range of 1:8-8:1, preferably in the range of 1:6-6:1; such as in the range of 1:4-4:1, and even more preferably in the range of 1:2-2:1, such as in the range of 1:1.5-1.5:1, and preferably in the range of 4:5 to 5:4.

It is also envisioned that the ratio by weight of 2-PGME and 1-PGME in the emulsifying system may be in the range of 3:7 to 10:1, such as in the range of 3:7 to 8:1, preferably in the range of 3:7 to 6:1, such as in the range of 3:7 to 4:1, and even more preferably in the range of 3:7 to 2:1, such as in the range of 3:7 to 1:1.

Additionally it is envisioned that the ratio by weight of 2-PGME and 1-PGME of the emulsifying system may be in the range of 3:7 to 10:1, such as in the range of 1:1 to 10:1, preferably in the range of 2:1 to 10:1, such as in the range of 4:1 to 10:1, and even more preferably in the range of 6:1 to 10:1, such as in the range of 8:1 to 10:1.

Emulsifying systems having the above ratios between 2-PGME and 1-PGME have been found to be useful for ice creams and particularly for low fat ice creams.

The emulsifying system typically comprises at least 5% 2-PGME by weight, such as at least 10%, or at least 20%, preferably at least 25%, such as at least 30%, and even more preferably at least 33%, such as at least 35%.

In some preferred embodiments of the invention, the emulsifying system even comprises at least 40% 2-PGME by weight, such as at least 45%, or at least 50%, preferably at least 55%, such as at least 60%, and even more preferably at least 65% such as at least 75%.

It is envisioned that the emulsifying system may comprise approximately 100% 2-PGME by weight, i.e. at least 80% by weight of a 2-PGME, such as at least 85, preferably at least 90%, such as at least 95%, and even more preferably at least 97.5% such as at least 99%.

In some preferred embodiments of the invention, the emulsifying system comprises at least 35% 2-PGME by weight.

The emulsifying system typically comprises at least 5% 1-PGME by weight, such as at least 10%, or at least 20%, preferably at least 25%, such as at least 30%, and even more preferably at least 33%, such as at least 35%.

In some preferred embodiments of the invention, the emulsifying system even comprises at least 40% 1-PGME by weight, such as at least 45%, or at least 50%, preferably at least 55%, such as at least 60%, and even more preferably at least 65% such as at least 75%.

In some preferred embodiments of the invention, the emulsifying system comprises 2-PGME in an amount in the range of 5-95% by weight, and 1-PGME in an amount in the range of 2-95% by weight.

For example, the emulsifying system may comprise 2-PGME in an amount in the range of 20-90% by weight, and 1-PGME in an amount in the range of 5-75% by weight.

Alternatively, the emulsifying system may comprise 2-PGME in an amount in the range of 30-90% by weight, and 1-PGME in an amount in the range of 5-60% by weight.

For example, the emulsifying system may comprise 2-PGME in an amount in the range of 35-95% by weight, and 1-PGME in an amount in the range of 5-65% by weight.

The emulsifying system may e.g. comprise 2-PGME in an amount in the range of 40-90% by weight, and 1-PGME in an amount in the range of 5-60% by weight.

Thus, the emulsifying system may comprise 2-PGME in an amount in the range of 40-70% by weight, and 1-PGME in an amount in the range of 25-60% by weight.

Also, the emulsifying system may comprise 2-PGME in an amount in the range of 40-60% by weight, and 1-PGME in an amount in the range of 40-60% by weight, such as 2-PGME in an amount in the range of 45-55% by weight, and 1-PGME in an amount in the range of 45-55% by weight A number of different fatty acids may be used in 1-PGME and 2-PGME of the emulsifying system.

However, the fatty acids of the 2-PGME and/or the 1-PGME typically comprise one or more fatty acid containing in the range of 4 to 24 carbon atoms, preferably in the range of 14-20 carbon atoms, and even more preferably in the range of 16-18 carbon atoms.

The term "and/or" used in the context "X and/or Y" should be interpreted as "X", or "Y", or "X and Y".

The 2-PGME and/or the 1-PGME may comprise a saturated fatty acid.

Alternatively or in addition, the fatty acid of the 2-PGME and/or the 1-PGME may comprise an unsaturated fatty acid, such as a mono-unsaturated fatty acid, or a poly-unsaturated fatty acid.

The emulsifying system may thus comprise a 2-PMGE comprising a saturated fatty acids, and a 2-PMGE comprising an unsaturated fatty acids.

Likewise, the emulsifying system may comprise a 1-PMGE comprising a saturated fatty acids, and a 1-PMGE comprising an unsaturated fatty acids.

Useful fatty acids may be derived from a number of different vegetable and animal fats. In some embodiments of the invention, at least one fatty acid of the 2-PGME or the 1-PGME is derived from a fat or oil selected from the group consisting of sunflower oil, sunflower seed oil, palm oil, palm kernel oil, coconut oil, rape seed oil, soya bean oil, and a mixture thereof.

In some preferred embodiments of the invention, the emulsifying system comprises one or more additional emulsifiers.

The additional emulsifier may e.g. comprise a diglyceride. Alternatively, or in addition thereto, the additional emulsifier may comprise a monoglyceride. Thus, the additional emulsifier may e.g. comprise a monoglyceride and a diglyceride.

The fatty acid of the monoglyceride may comprise a saturated fatty acid.

In the context of the present invention, when reference is made to one or more fatty acids of a monoglyceride, a diglyceride, a triglyceride, a PGME, or a PDME, it should be understood that the fatty acids are not in their free form, but are bound to glycerol or propylene glycol by means of ester bonds. It is, however, possible to derived the fatty acids from these esters by hydrolysis.

The fatty acids of the diglyceride may comprise saturated fatty acids.

The fatty acid of the monoglyceride may comprise an unsaturated fatty acid.

The fatty acids of the diglyceride may comprise unsaturated fatty acids.

The fatty acids of the monoglyceride may comprise a saturated fatty acid and an unsaturated fatty acid.

The fatty acids of the diglyceride may comprise saturated fatty acids and unsaturated fatty acids.

In some embodiments of the invention, the emulsifying system comprises of diglyceride in an amount of at least 5% by weight, such as at least 10%, or at least 20%, preferably at least 25%, such as at least 30%, and even more preferably at least 33%, such as at least 35%.

The emulsifying system even comprises at least 40% diglyceride by weight, such as at least 45%, or at least 50%, preferably at least 55%, such as at least 60%, and even more preferably at least 65% such as at least 75%.

The additional emulsifier may comprise one or more other emulsifiers described herein.

However, in some embodiments of the invention, the emulsifying system does not contain sorbitan tristearate.

The ratio by weight between the total amount of propylene glycol monoester and the total amount of monoglyceride and diglyceride may be at least 1:4, such as at least 1:3, preferably at least 1:2, such as at least 1:1, and even more preferably preferably at least 2:1

For example, the ratio by weight between the total amount of propylene glycol monoester and the total amount of monoglyceride and diglyceride may be in the range of 1:4 to 10:1, preferably in the range 1:3-5:1, such as in the range 1:3-3:1, and even more preferably in the range 1:2-2:1

In some embodiments of the invention, the emulsifying system additionally comprises one or more components selected from the group consisting of monoglycerides, diglycerides, triglycerides, glycerol, free fatty acids, and mixtures thereof. The emulsifying system may furthermore comprise diesters of fatty acids and propane-1,2-diol, typically in small amounts if present at all.

As mentioned above, it is envisioned that the emulsifying system may comprise useful additives such as a stabilizer. For example, the emulsifying system may comprise in the range of 1-90% stabilizer by weight, preferably in the range of 10-80% stabilizer by weight, such as in the range of 15-60% stabilizer by weight, and even more preferred in the range of 20%-50% stabilizer by weight.

The present inventors have found that the emulsifying system advantageously may contain one or more stabilisers before the emulsifying system is added to the food product. The presence of the emulsifiers in the emulsifying system eases the dispersion and homogeneous distribution of the emulsifier and the stabiliser in the food product. It is believed that the emulsifiers of the emulsifying system act as wetting agents on the surface of the stabilisers, thus enhancing the wettability and the dispersion of the stabiliser. Without being bound by theory, it is furthermore believed that some of the unique properties of the frozen food products of the invention at least partly are a result of the improved dispersion of the stabiliser in the frozen food product.

The emulsifying system may be formulated in a number of different ways depending on the application in which it has to be used.

The emulsifying system may e.g. be in liquid form, in semi-solid form, or in solid form, e.g. at 25° C. For example, at the emulsifying system may be in the form of a powder, a granulate, or a paste. The powder or granulate is preferably free flowing.

The emulsifier of the emulsifying system may comprise hydrated emulsifiers, e.g. hydrated in water or in one or more polyol, such as propylene glycol (propane-1,2-diol) and/or glycerol. The hydrated emulsifiers may furthermore be hydrated in a mixture of water and propane-1,2-diol, or in a mixture of water glycerol.

Preparation of a hydrated emulsifier can e.g. be done by mixing water and/or polyol and an emulsifier at a temperature below the melting point of the emulsifier and successively increasing the temperature to a point above the melting point, optionally adjusting the pH, and cooling the hydrated emulsifier below the melting point of the emulsifier, e.g. ambient temperature.

For example, at least 25% by weight of the total amount of emulsifier of the emulsifying system may be hydrated emulsifiers, preferably at least 50% by weight of the total amount of emulsifier, such as at least 75% by weight, and even more preferably at least 90% by weight such as at least 95% by weight of the total amount of emulsifiers may be hydrated emulsifiers. Substantially all the emulsifiers of the emulsifying system may be hydrated.

In some embodiments of the invention, the emulsifier of the emulsifying system comprises emulsifiers dissolved or incorporated in fat.

Normally, at least 25% by weight of the total amount of emulsifier of the emulsifying system is dissolved or incorporated in fat, preferably at least 50% by weight of the total amount of emulsifier, such as at least 75% by weight, and even more preferably at least 90% by weight such as at least 95% by weight of the total amount of emulsifiers may be dissolved or incorporated in fat. Substantially all the emulsifiers of the emulsifying system may be hydrated.

The present inventors have found 2-PGME of the emulsifying system is converted to 1-PGME under some conditions, possibly due to acyl migration. The inventors have discovered that this problem can be solved by keeping the emulsifying system at low temperature, e.g. during storage and/or during transportation.

Thus, in some preferred embodiments of the invention, the temperature of the emulsifying system is at most 45° C., preferably at most 35° C., such as at most 25° C., and even more preferred at most 5° C., such as at most 0° C. For example, the temperature of the emulsifying system may be at most 45° C. during storage and/or during transportation, preferably at most 35° C., such as at most 25° C., and even more preferred at most 5° C., such as at most 0° C. during storage and/or during transportation.

In some embodiments of the invention, the temperature of the emulsifying system, e.g. during storage and/or during transportation, is in the range of −30° C. to 45° C., such as 0° C.-40° C., preferably 5° C.-35° C., and even more preferably in the range 10° C.-30° C., such as in the range 15° C.-25° C.

Yet another aspect of the invention relates to a packaged emulsifying system comprising a container, said container comprising an emulsifying system as described herein and a container wall, which protects the emulsifying system from the surrounding environment.

The temperature of the emulsifier system of the packaged emulsifier system, e.g. during storage and/or during transportation, is preferably in the range of −30° C. to 45° C., such as 0° C.-40° C., preferably 5° C.-35° C., and even more preferably in the range 10° C.-30° C., such as in the range 15° C.-25° C.

The present emulsifying systems appear to have an acceptable stability, especially when stored or transported in solid form.

Thus, in some embodiments of the invention, the emulsifiers of the emulsifying system is in solid form during storage and/or during transportation.

In some embodiments of the invention, the emulsifying system is in solid form during storage and/or during transportation.

A further aspect of the invention relates to a method of preparing a frozen food product comprising the step of
a) mixing a food intermediate with an emulsifying system as described herein, thus obtaining the mixture,
b) optionally, heating the mixture or the food intermediate to a temperature sufficient for the emulsifying system to soften or melt, and
c) freezing the resulting mixture.

In some embodiments of the invention, step b) is not optional, thus the mixture is heated to a temperature sufficient for the emulsifying system to melt. The temperature is typically near the softening point or melting point of the emulsifying system.

The emulsifying system which is added in step a) may e.g. comprise a hydrated emulsifier or an emulsifier dissolved or incorporated in fat. An advantage of an emulsifying system comprising a hydrated emulsifier is that step b) may be omitted.

Step a) and b) may be performed separately or concurrently, i.e. the food intermediate may be heated to the temperature of step b) when the emulsifying system is added.

As mentioned above, the components of the emulsifying system can both be applied to food intermediate as a mixture, or separately but at the same time. Alternatively, the components of the emulsifying system can be applied to the other ingredients of the frozen food product separately and at different times during the production of the frozen food product.

Normally, 2-PGME is present in an amount of at least 0.01% by weight of the food intermediate, such as at least 0.1% by weight, preferably at least 0.15% by weight, such as at least 0.2% by weight, and even more preferably at least 0.25% by weight of the food intermediate.

2-PGME may for example be present in an amount of 0.01% to 10.0% by weight of the food intermediate, such as in an amount of 0.1% to 1% by weight, preferably in an amount of 0.15% to 0.5% by weight, and even more preferably in an amount of 0.2% to 0.4% by weight, such as in an amount of 0.25% to 0.35% by weight.

Monoglyceride and/or diglyceride may be present in an amount of 0.01% to 5.0% by weight of the food intermediate. The ratio by weight between the total amount of propylene glycol monoester and a total amount of monoglyceride and diglyceride is typically in the range of 1:4 to 10:1.

The method of preparing the frozen food product may furthermore comprising one or more steps selected from the group of:
pasteurizing the mixture,
homogenizing the mixture
sterilizing the mixture,
cooling the mixture,
aging the mixture,
aerating the mixture,
freezing the mixture, and
combinations thereof.

A number of useful features related to the preparation of frozen food products, such as pasteurization, homogenization, aging, aeration, sterilization, and freezing, are e.g. described in Arbuckle and Marshall and in the PCT application WO 2005/060,763. The contents of both documents are incorporated herein by reference for all purposes.

A preferred method of sterilizing the mixture is ultra high temperature (UHT) sterilization.

In some preferred embodiments of the invention, the method comprises step a), and the steps of:

homogenize the mixture of step b)
sterilizing the mixture
aging the mixture,
aerating the mixture, and
freezing the mixture.

Yet an aspect of the invention relates to the use of an emulsifying system as described herein as emulsifier in a frozen food product.

The emulsifying system is particularly useful as emulsifier in frozen food products such as frozen desserts, ice cream, low fat ice cream, ice milk, sherbets, sorbet, frozen fruit juice, frozen yoghurt, frozen water ice, aerated frozen bars, creams, and imitation creams.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1

Preparation of 1-PGME and 2-PGME

The following two basic ice cream recipes were used for the examples mentioned herein:
5% fat ice cream:

| | |
|---|---|
| Vegetable palm kernel fat (Polawar E31) | 5% |
| Skim milk powder | 6% |
| Whey powder | 6% |
| Sucrose | 11.5% |
| Glucose sirup 42DE | 3.35% |
| Guar gum | 0.169 |
| Carrageenan | 0.0455% |
| Emulsifiers | as specified |
| Water | q.s. |

2% fat ice cream:

| | |
|---|---|
| Vegetable palm kernel fat (Polawar E31) | 2% |
| Skim milk powder | 6.25% |
| Whey powder | 6.25% |
| Sucrose | 12% |
| Glucose sirup 42DE | 4% |
| Guar gum | 0.195 |
| Carrageenan | 0.0525% |
| Emulsifiers | as specified |
| Water | q.s. |

Example 2

Process for Preparing Ice Cream

The ice creams to be tested were all prepared by the same general process. All the ingredient were mixed in the water and heated to 75° C. Then the entire mixture was homogenized at 200 bar followed by pasteurisation at 83° C. for approximately 30 seconds. The homogenized ice cream mixture was allowed to rest for 18 hours at 5° C. before it was aerated and frozen in a lab scale continuous freezer. When the ice cream reached a temperature of −53 to −6° C. it was filled in 0.2 L paper boxes and frozen to −30° C. for 24 hours. After this step the temperature was raised to −20° C. for minimum 120 hours before the characteristics of the ice cream was tested.

Example 3

Tests for Characterising the Ice Cream

The ice creams according to the invention were exposed to the following tests:
Sensory Test Sensory test is performed in panel of 7 persons. The panel evaluates the ice cream with respect to its texture, ice crystal size, creaminess, coolness, flavour, sandyness, and visual appearance.
Melt Test:

The melt test and the determination of the melt figure of the ice cream is performed as follows.

A sample of ice cream having a temperature in the range of −18° C. to −20° C. is taken out of the freezer its weight is measured. The sample is then placed on a 4 mm mesh in an air circulated incubator at 25° C. Under the mesh a balance is located for measuring the weight of liquid ice cream that melts off the ice cream sample. During the next 90 minutes, the weight of melted ice is reported by means of data transfer from the balance to a computer.

The melt figure is expressed as the loss of weight in % of the ice cream sample after 90 minutes of incubation at 25° C.

The melt figure for each type of ice cream is measure by double determination

The melt figure is determined both for ice cream that been exposed to a heat shock and ice cream that has not been exposed to a heat shock.
Heat Shock:

The some of the ice creams were exposed to a so-called heat shock to observe sensitivity of the ice cream to temperature fluctuations in its environment. The heat shock was provoked by storing the ice cream for 1 week at −20° C. (−19° C. to −21° C.), then for 4 days at −10° C. (−9° C. to −11° C.), and finally for 1 week at −20° C. (−19° C. to −21° C.).

After the heat shock the melt-down properties and sensory properties of the ice cream was evaluated.

Example 4

Experiment A

Results from tests done in accordance with the above described and using 0.240% propyleneglycolmonoester with different ratio between the 1- and 2-isomer and 0.14% monoglyceride (95% mono, iodine value<2) as coemulsifier are shown in the Table 1 below

TABLE 1

Results for an ice cream formulation containing 5% fat, 0.24% PGME and 0.143% monoglyceride; HS = after heat shock.

| 2-PGME relative to total PGME | 1-PGME relative to total PGME | Melt figure | Melt figure (HS) | Sensory score |
|---|---|---|---|---|
| 91% | 9% | 32% | 53% | 2 |
| 78% | 22% | 32% | 50% | 3 |
| 60.5% | 39.5% | 28% | 45% | 4 |
| 51.8% | 48.2% | 28% | 45% | 5 |

TABLE 1-continued

Results for an ice cream formulation containing 5% fat, 0.24% PGME and 0.143% monoglyceride; HS = after heat shock.

| 2-PGME relative to total PGME | 1-PGME relative to total PGME | Melt figure | Melt figure (HS) | Sensory score |
|---|---|---|---|---|
| 33% | 66% | 30% | 59% | 2 |
| 30% | 70% | 28% | 45% | 4 |
| 16.9% | 83.1% | 28% | 50% | 2 |

From the test it can be concluded that the ratio between the two isomers of propyleneglycolmonoester giving the best ice cream in terms of sensory score is approximately 1:1, but even 1:3 ratio between 1- and 2-isomer shows a quality improvement in terms of sensory scores. The melting figures shows that this parameter seems to be rather insensible to the changes in the ratio of the propyleneglycolmonoester isomers.

Example 5

Experiment B

In addition to the tests done with a saturated (iodine value>2) monoglyceride ice cream preparations with different unsaturated monoglycerides and diglycerides have been done i.e. the ratio between the monoglyceride and the diglyceride have been varied from 95:5 to 20:80. The results for a 5% fat ice cream are shown in the table 2 below

TABLE 2

Results for an ice cream formulation containing 5% fat, 0.24% of total PGME and varying amount of unsaturated monoglyceride and diglyceride.

| 2-PGME relative to total PGME | 1-PGME relative to total PGME | Unsat. MG | Unsat. DG | Melt Figure | Melt figure (HS) | Sensory score |
|---|---|---|---|---|---|---|
| 52% | 48% | 0.10% | 0.04% | <5% | 47% | 4 |
| 52% | 48% | 0.06% | 0.19% | <5% | 23% | 5 |
| 33% | 66% | 0.10% | 0.04% | 6% | 55% | 4 |
| 33% | 66% | 0.06% | 0.19% | <5% | 37% | 5 |
| 33% | 66% | 0.10% | 0.30% | <5% | 48% | 5 |

Unsat. MG = unsaturated monoglyceride;
Unsat. DG = unsaturated diglyceride;
HS = after heat shock.

The melting of the ice creams before heat shock is found to decrease when the saturated monoglyceride is replaced by unsaturated mono- and diglycerides. After heat shock it is found that the 1:1 ratio between the two PGME isomers increase the melting resistance compared to a 1:2 ratio of 2-PGME to 1-PGME. Further it is found that an increase in the ratio of diglyceride to monoglyceride improves the sensory score.

Example 6

Experiment C

Results from a test done with a 2% fat ice cream is recorded in Table 3 below.

TABLE 3

Results of an ice cream formulation containing 2% fat, 0.24% total PGME, and varying amounts of unsaturated monoglyceride and diglyceride.

| 2-PGME relative to total PGME | 1-PGME relative to total PGME | Unsat. MG | Unsat. DG | Melt figure | Melt figure (HS) | Sensory score |
|---|---|---|---|---|---|---|
| 52% | 48% | 0.10% | 0.04% | 58% | 63% | 4 |
| 52% | 48% | 0.06% | 0.19% | 55% | 63% | 5 |

Unsat. MG = unsaturated monoglyceride;
Unsat. DG = unsaturated diglyceride;
HS = after heat shock.
Melt figures after 90 min.

It appears that it is possible to produce a 2% fat ice cream with a high sensory score. It was found that an increase in the ratio of diglyceride to monoglyceride improves the sensory score.

Example 7

Experiment D

A series of various compositions of PGME have been tested together with various compositions of monoglycerides and diglycerides in a 5% fat ice cream formulation. The results are shown in Tables 4 and 6.

TABLE 4

Results for an ice cream formulation containing 5% fat, 0.24% of total PGME and varying amount of monoglycerides and diglycerides.

| 2-PGME relative to total PGME | 1-PGME relative to total PGME | Sat. MG | Unsat. MG | Unsat. DG | Melt Figure | Melt figure (HS) | Sensory score |
|---|---|---|---|---|---|---|---|
| 33% | 66% | 0.14% | | | 17 | 47 | 3 |
| 52% | 48% | 0.14% | | | 25 | 45 | 4 |
| 20% | 72% | 0.14% | | | 29 | 44 | 2 |
| 52% | 48% | | 0.10% | 0.04% | 10 | 51 | 3 |
| 52% | 48% | | 0.06% | 0.19% | 3 | 19 | 5 |

Sat. MG = saturated monoglyceride
Unsat. MG = unsaturated monoglyceride;
Unsat. DG = unsaturated diglyceride;
HS = after heat shock.
Melt figures after 90 min.

It is observed that the combination of the 2 isomers of PGME in the ratio 1:1 and an unsaturated mono- and diglyceride with high level of diglyceride increase the melting resistance of the ice cream. Same combination gives the highest sensory score especially creaminess among the samples in this test run. The sample of ice cream produced with the highest level of 1-PGME is described as cold and less creaminess. From the trials with only saturated monoglyceride added it is observed that increasing ratio of 1-PGME in the mixture decrease the sensory score of the ice cream.

The ice crystal diameters of the samples were measured by means of SEM (Scanning electron microscopy).

TABLE 5

Ice crystal diameters

| 2-PGME relative to total PGME | 1-PGME relative to total PGME | Sat. MG | Unsat. MG | Unsat. DG | $X_{50.3}$ | $Span_3$ |
|---|---|---|---|---|---|---|
| 33% | 66% | 0.14% | | | 39.24 | 1.09 |
| 52% | 48% | 0.14% | | | 39.46 | 1.17 |
| 20% | 72% | 0.14% | | | 40.96 | 1.44 |
| 52% | 48% | | 0.10% | 0.04% | 39.16 | 1.28 |
| 52% | 48% | | 0.06% | 0.19% | 38.05 | 0.93 |

It is observed that smallest ice crystals was obtained with the combination of the 2 isomers of PGME in the ratio of approximately 1:1 and an unsaturated mono- and diglyceride with high level of diglyceride i.e. the same combination as resulted in slowest melt down and highest heat shock stability re. Table 4. The largest ice crystals and widest span of size distribution was found in the sample with high ratio of the 1-PGME isomer.

Figure 1:
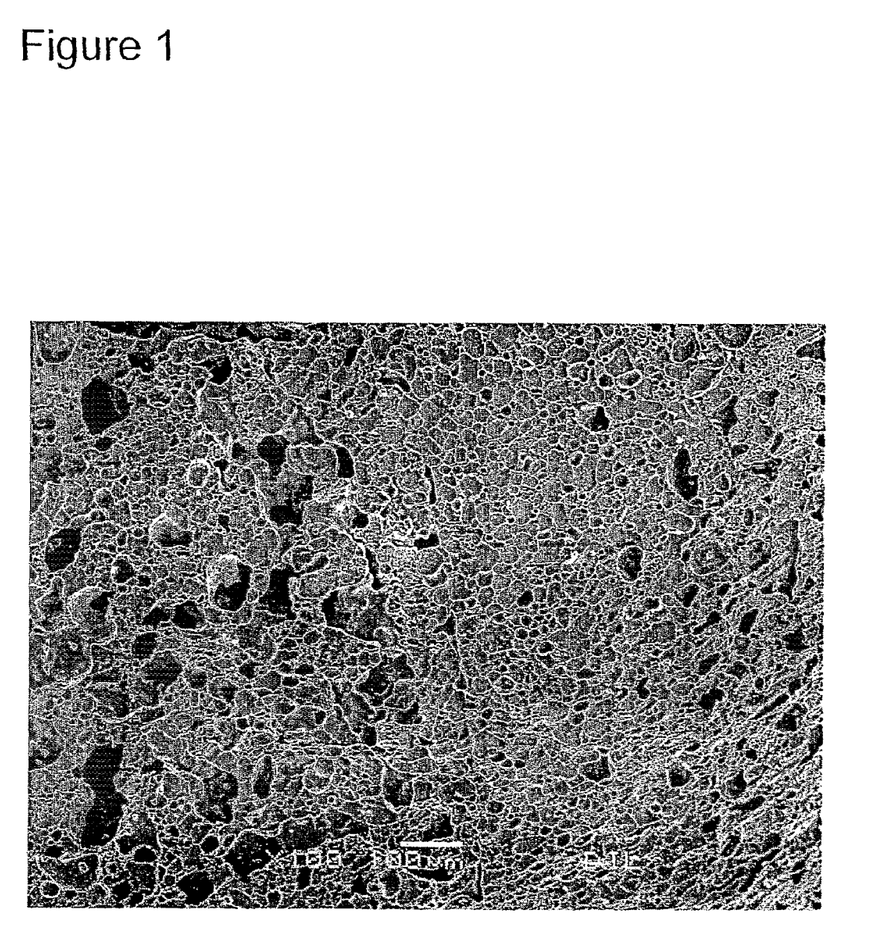
FIG. 1 shows a SEM picture of an ice cream containing PGME (approximately 50% 2-PGME and 50% 1-PGME) as well as unsaturated diglycerides.
Figure 2:
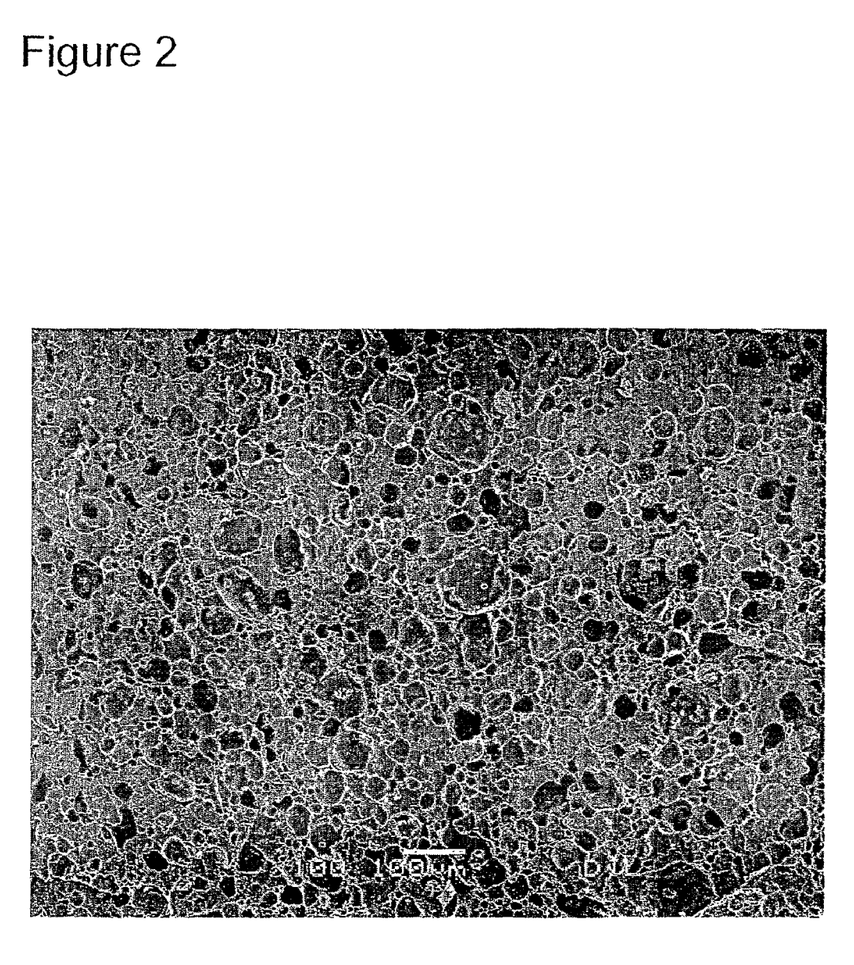
FIG. 2 shows a SEM picture of an ice cream containing PGME (approximately 50% 2-PGME and 50% 1-PGME) as well as unsaturated monoglycerides and diglycerides.
Figure 3:
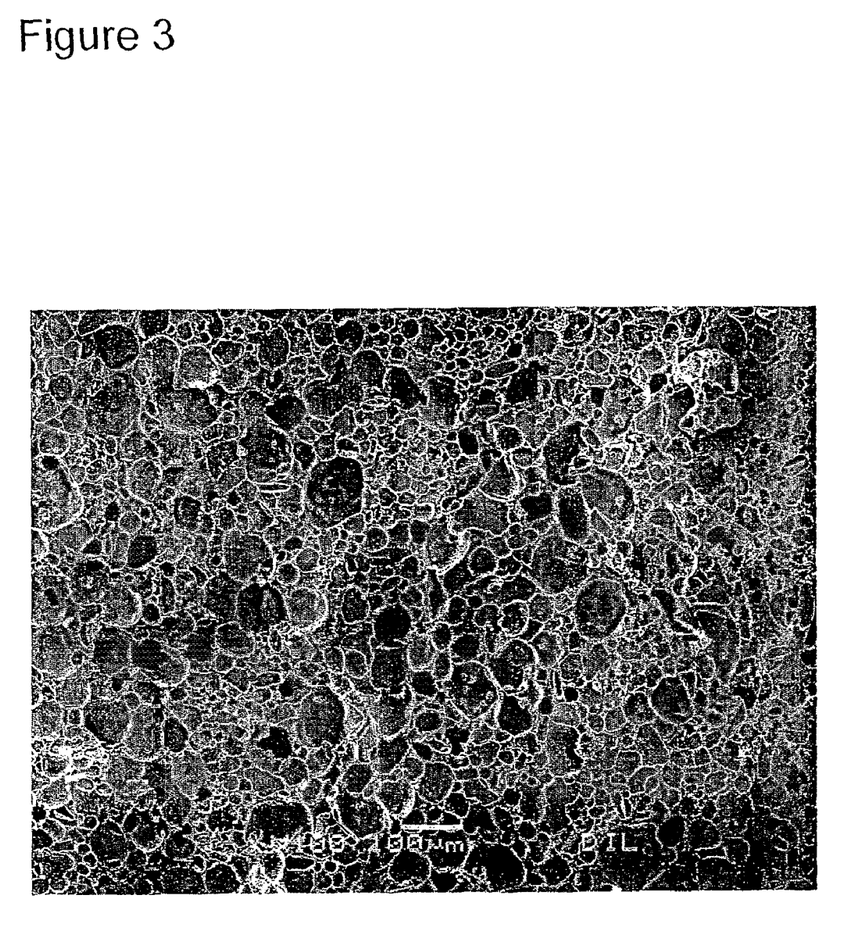
FIG. 3 shows a SEM picture of an ice cream containing PGME (approximately 50% 2-PGME and 50% 1-PGME) as well as saturated monoglycerides and diglycerides.
Figure 4:
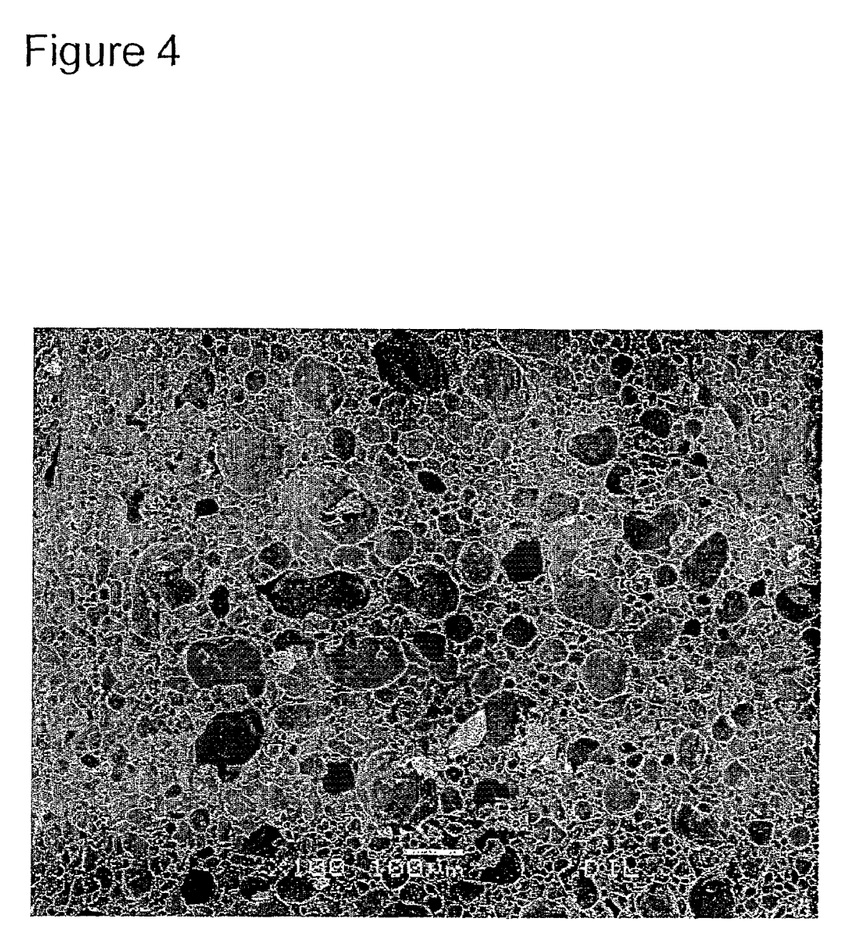
FIG. 4 shows a SEM picture of an ice cream containing PGME (approximately 33% 2-PGME and 66% 1-PGME) as well as saturated monoglycerides and diglycerides.
Figure 5:
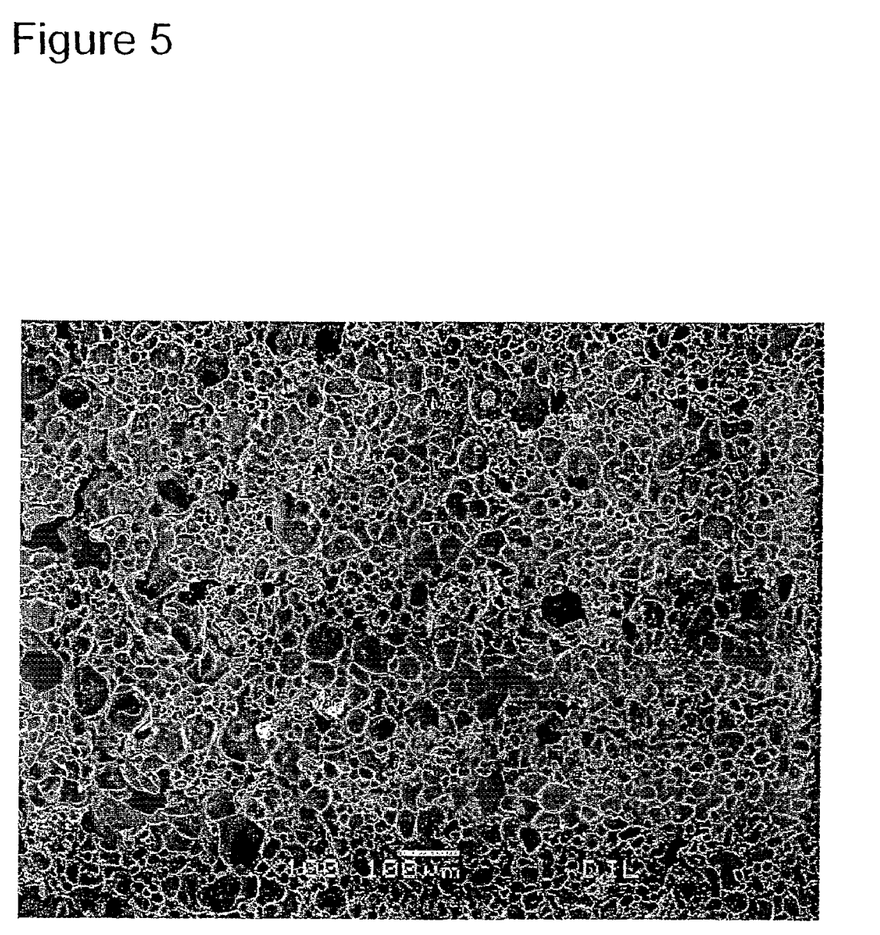
FIG. 5 shows a SEM picture of an ice cream containing PGME (approximately 22% 2-PGME and 78% 1-PGME) as well as saturated monoglycerides and diglycerides.

The structure of the ice creams can be seen from the SEM pictures of FIGS. 1-5. FIG. 1 shows a SEM picture of an ice cream containing approximately 52% 2-PGME and 48% 1-PGME as well as unsaturated diglycerides; FIG. 2 shows a SEM picture of an ice cream containing approximately 52% 2-PGME and 48% 1-PGME as well as unsaturated monoglycerides and diglycerides; FIG. 3 shows a SEM picture of an ice cream containing approximately 52% 2-PGME and 48% 1-PGME as well as saturated monoglycerides and diglycerides; FIG. 4 shows a SEM picture of an ice cream containing approximately 33% 2-PGME and 66% 1-PGME as well as saturated monoglycerides and diglycerides; and FIG. 5 shows a SEM picture of an ice cream containing PGME approximately 22% 2-PGME and 78% 1-PGME as well as saturated monoglycerides and diglycerides,

TABLE 6

Results of an ice cream formulation containing 5% fat, 0.24% total PGME, and varying amounts of unsaturated monoglyceride and diglyceride.

| 2-PGME relative to total PGME | 1-PGME relative to total PGME | Unsat. MG | Unsat. DG | $I_2$ value | Melt figure | Melt figure (HS) | Sensory score (HS) |
|---|---|---|---|---|---|---|---|
| 33% | 66% | 0.07% | 0.20% | 71 | <3% | 37% | 4 |
| 33% | 66% | 0.01% | 0.29% | 73 | <3% | 33% | 5 |
| 33% | 66% | 0.02% | 0.37% | 73 | 18% | 60% | 5 |
| 33% | 66% | 0.04% | 0.21% | 86 | <3% | 10% | 4 |
| 33% | 66% | 0.04% | 0.17% | 86 | <3% | 7% | 4 |

Unsat. MG = unsaturated monoglyceride;
Unsat. DG = unsaturated diglyceride;
$I_2$ value = iodine value;
HS = after heat shock.
Melt figures after 90 min.

The results show that increasing level of unsaturated diglyceride increase the sensory score. It seems like there exists an optimum for addition of diglycerides when taking melt down properties into consideration. Further it is observed that the effect on the melting properties depends not only on the level of diglyceride but also on the iodine value of the diglyceride.

Example 8

Experiment E

A series of various compositions of PGME have been tested together with various compositions of monoglycerides and diglycerides in a 2% fat ice cream formulation. The results are shown in Table 7.

TABLE 7

Results of an ice cream formulation containing 2% fat, 0.24% PGME and varying amounts of unsaturated monoglyceride and diglyceride.

| 2-PGME relative to total PGME | 1-PGME relative to total PGME | Unsat. MG | Unsat. DG | $I_2$ Value | Melt figure | Melt figure (HS) | Sensory score (HS) |
|---|---|---|---|---|---|---|---|
| 33% | 66% | 0.07% | 0.20% | 71 | 60% | 56% | 4 |
| 33% | 66% | 0.01% | 0.29% | 73 | 59% | 54% | 5 |
| 33% | 66% | 0.02% | 0.37% | 73 | 54% | 51% | 5 |
| 33% | 66% | 0.04% | 0.21% | 86 | 51% | 50% | 4 |
| 33% | 66% | 0.04% | 0.17% | 86 | 53% | 57% | 4 |

Unsat. MG = unsaturated monoglyceride;
Unsat. DG = unsaturated diglyceride;
$I_2$ value = iodine value;
HS = after heat shock.

It is observed that the sensory score is influenced by the level of unsaturated diglycerides in the ice cream.

Example 9

Experiment F

A series of various compositions of PGME have been tested together with a high level of unsaturated diglycerides in a 5% fat ice cream formulation. The results are shown in Table 8.

TABLE 8

Results of an ice cream formulation containing 5% fat and 0.24% total PGME.

| 2-PGME relative to total PGME | 1-PGME relative to total PGME | Unsat. MG | Unsat DG | $I_2$ Value | Melt figure | Melt figure (HS) | Sensory score (HS) |
|---|---|---|---|---|---|---|---|
| 34% | 66% | 0.01% | 0.29% | 73 | 31% | 61% | 4 |
| 50% | 50% | 0.01% | 0.29% | 73 | 2% | 4% | 5 |
| 33% | 66% | 0.02% | 0.37% | 73 | 31% | 50% | 4 |

Unsat. MG = unsaturated monoglyceride;
Unsat DG = unsaturated diglyceride;
$I_2$ value = iodine value;
HS = after heat shock.

It is from above tests concluded that the combination the 1 and 2 isomers of PGME in the ratio 1:1 together with unsaturated diglyceride has a great positive effect on the melting properties of the ice cream compared to a PGME with the two isomers in the proportion 1:2. This is noticed for as well fresh ice cream as for ice cream exposed to heat shock. Increasing the dosage of unsaturated diglyceride improves the melting properties of the ice cream produced with the last mentioned PGME-mixture but not to a level comparable with ice cream produced with the 1:1 ratio of PGME isomers.

It is also concluded that in highest sensory score especially creaminess is obtained when using the PGME with the 1:1 ratio of the 1-PGME and 2-PGME.

Reference

Martin and Lutton Martin J. B. and Lutton E. S., Jour. Am. Oil Chem. Soc. 1965, 42, 529

Arbuckle and Marshall Arbuckle W. S. and Marshall R. T. 1996, Ice Cream, 5th ed. Chapman & Hall US 2005/0,123,666 (US patent application)

WO 2005/060,763 (PCT application)

The invention claimed is:

1. An emulsifying system comprising a 2-propylene glycol monoester of a fatty acid (2-PGME) and a 1-propylene glycol monoester (1-PGME), wherein the emulsifying system comprises 2-PGME in an amount in the range of 40-70% by weight, and 1-PGME in an amount in the range of 25-60% by weight.

2. The emulsifying system according to claim 1, wherein the fatty acid of the 2-PGME and/or the 1-PGME comprises an unsaturated fatty acid.

3. The emulsifying system according to claim 1, wherein the fatty acid contains 16 or 18 carbon atoms.

4. The emulsifying system according to claim 1, which comprises one or more additional emulsifier.

5. The emulsifying system according to claim 4, wherein the additional emulsifier comprises a diglyceride.

6. The emulsifying system according to claim 4, wherein the additional emulsifier comprises a monoglyceride.

7. The emulsifying system according to claim 4, wherein the additional emulsifier comprises a monoglyceride and a diglyceride.

8. The emulsifying system according to any of the claim 5, wherein the fatty acid of the monoglyceride and/or diglyceride comprise an unsaturated fatty acid.

9. The emulsifying system according to claim 7, wherein the ratio by weight between the monoglyceride and the diglyceride is at most 50:50.

10. The emulsifying system according to claim 7, wherein the ratio by weight between the monoglyceride and the diglyceride is in the range of 4:96 to 40:60.

11. The emulsifying system according to claim 1, wherein the emulsifier of the emulsifying system comprises hydrated emulsifiers.

12. The emulsifying system according to claim 1, wherein the emulsifier of the emulsifying system comprises emulsifiers dissolved or incorporated in fat.

13. A frozen food product comprising an emulsifying system according to claim 1.

14. The frozen food product according to claim 13, wherein the frozen food product is an aerated frozen food product.

15. The frozen food product according to claim 13, wherein the frozen food product comprises at least one frozen food product selected from the group consisting of ice cream, low fat ice cream, ice milk, sherbet, sorbet, frozen fruit juice, frozen yoghurt, frozen water ice, aerated frozen bars, frozen dessert, frozen aerated cream, unwhipped dairy cream, imitation creams, and a combination thereof.

16. A packaged emulsifying system comprising a container, said container comprising an emulsifying system according to claim 1.

17. The packaged emulsifying system according to claim 16, wherein the temperature of the emulsifying system is in the range of −30° C. to 45° C.

18. Method of preparing a frozen food product comprising
 a) mixing a food intermediate with an emulsifying system according to claim 1, thus obtaining a mixture,
 b) optionally, heating the mixture to a temperature sufficient for the emulsifying system to soften or melt, and
 c) freezing the mixture from step a) or step b).

19. Use of an emulsifying system according to claim 1 as an emulsifier in a frozen food product.

* * * * *

UNITED STATES PATENT AND TRADEMARK OFFICE
CERTIFICATE OF CORRECTION

PATENT NO.        : 8,221,820 B2
APPLICATION NO.   : 12/516506
DATED             : July 17, 2012
INVENTOR(S)       : Norn et al.

Page 1 of 1

It is certified that error appears in the above-identified patent and that said Letters Patent is hereby corrected as shown below:

Title page, (73) Assignee city: "Julesminde (DK)" should read --Juelsminde, (DK)--

Col. 22, line 8, claim 8: "to any of the claim 5," should read --to claim 7,--

Signed and Sealed this
Thirtieth Day of October, 2012

David J. Kappos
*Director of the United States Patent and Trademark Office*